(12) United States Patent
Lang

(10) Patent No.: US 6,572,135 B2
(45) Date of Patent: Jun. 3, 2003

(54) ASSEMBLY, IN PARTICULAR GAS BAG MODULE

(75) Inventor: Norbert Lang, Leinzell (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/798,108

(22) Filed: Mar. 2, 2001

(65) Prior Publication Data

US 2001/0022440 A1 Sep. 20, 2001

(30) Foreign Application Priority Data

Mar. 16, 2000 (DE) ..................................... 200 04 830 U

(51) Int. Cl.⁷ .............................................. B60R 21/16
(52) U.S. Cl. ................. 280/728.2; 280/728.3; 280/732; 403/279
(58) Field of Search ......................... 280/728.1, 728.2, 280/728.3, 732; 403/279, 781

(56) References Cited

U.S. PATENT DOCUMENTS

| 5,356,174 A | * | 10/1994 | Rhein et al. | ......... 280/728.2 X |
| 5,533,750 A | * | 7/1996 | Karlow et al. | ....... 280/724.2 X |
| 5,564,732 A | * | 10/1996 | Bauer et al. | ............. 280/728.2 |
| 5,605,347 A | * | 2/1997 | Karlow et al. | ........... 280/728.2 |
| 5,762,361 A | * | 6/1998 | Herrmann et al. | ........ 280/728.2 |
| 5,775,724 A | * | 7/1998 | Tonooka et al. | ......... 280/728.2 |
| 5,788,268 A | * | 8/1998 | Goss et al. | ............... 280/728.2 |
| 5,791,682 A | * | 8/1998 | Hiramitsu et al. | ....... 280/728.2 |
| 5,899,485 A | | 5/1999 | Folsom et al. | |
| 6,010,146 A | * | 1/2000 | Otsuka et al. | ........... 280/728.2 |
| 6,039,341 A | * | 3/2000 | Doxey et al. | ............. 280/728.2 |
| 6,092,833 A | * | 7/2000 | Nariyasu | .................. 280/728.2 |
| 6,149,184 A | * | 11/2000 | Ennis et al. | ......... 280/728.2 X |
| 6,161,865 A | * | 12/2000 | Rose et al. | .............. 280/728.2 |

FOREIGN PATENT DOCUMENTS

| DE | 19630819 | 2/1998 |
| WO | 9920494 | 4/1999 |

\* cited by examiner

*Primary Examiner*—Paul N. Dickson
*Assistant Examiner*—Toan C To
(74) *Attorney, Agent, or Firm*—Tarolli, Sundheim, Covell & Tummino L.L.P.

(57) ABSTRACT

An assembly consists of a first component and of a second component. The first component is provided with at least one opening and with at least one holding projection which is associated with the opening The second component consists of sheet metal and is provided with at least one holding tongue which has a cross-piece and a head. The cross-piece extends through the opening in the first component and is bent around such that the head lies against the side of the holding projection facing away from the opening.

4 Claims, 3 Drawing Sheets

ASSEMBLY, IN PARTICULAR GAS BAG MODULE

The invention relates to an assembly, consisting of a first component and a second component which are fastened to each other.

BACKGROUND OF THE INVENTION

For the fastening of two components to each other, a variety of solutions are known. In gas bag modules, for the fastening of for example a holding frame for a gas bag to a housing part of the gas bag module frequently screws and nuts are used in order to obtain a reliable connection which is able to be loaded. Also various experiments are known for fastening such components to each other by metal tongues which are inserted through openings in the other component and are then bent around. It is critical in such types of fastening that the desired capability of taking tensile load is maintained with the necessary reliability.

BRIEF DESCRIPTION OF THE INVENTION

The invention provides an assembly consisting of a first component and of a second component. The first component is provided with at least one opening and with at least one holding projection which is associated with the opening. The second component consists of sheet metal and is provided with at least one holding tongue which has a cross-piece and a head. The cross-piece extends through the opening in the first component and is bent around such that the head lies against the side of the holding projection facing away from the opening. This type of connection offers two kinds of resistance to a separation of the first component from the second component: on the one hand a resistance resulting from the bending around of the cross-piece of the holding tongue and on the other hand for the case where this resistance force were to be overcome, a supporting force which acts between the head of the holding tongue and the holding projection and prevents the holding tongue from being drawn through the opening.

Advantageous developments of the invention will be apparent from the sub-claims.

BRIEF DESCRIPTION OF THE DRAWINGS

The invention is described below with reference to a preferred embodiment which is illustrated in the enclosed drawings, in which.

DETAILED DESCRIPTION OF THE INVENTION

Figure 1:
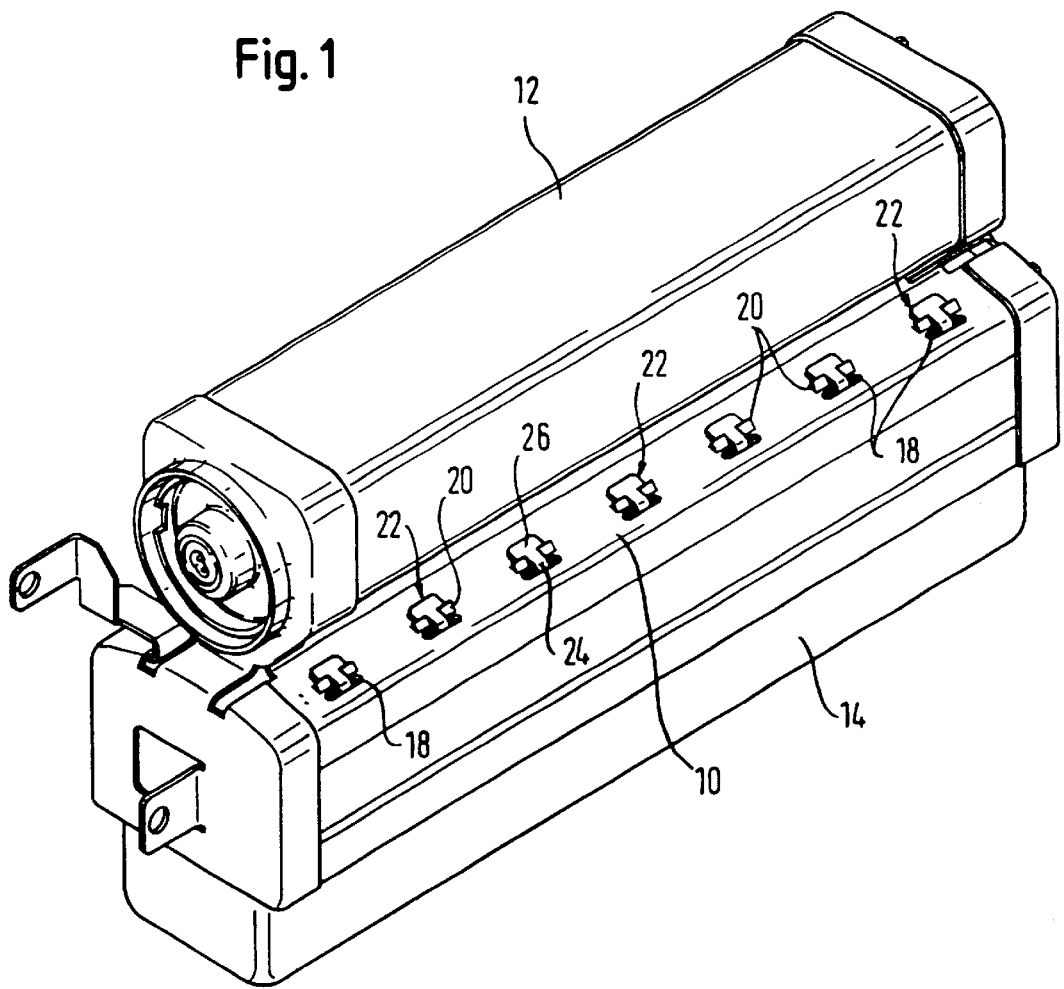
FIG. 1 shows in a perspective view an assembly according to the invention in installed state.

The first component of the assembly in the embodiment shown forms a housing part 10 of a gas bag module for a vehicle occupant restraint system. Inside the housing part 10 a gas generator 12 is arranged which after activation can provide a gas, which is under pressure, in order to unfold a gas bag 14, illustrated here diagrammatically in folded state. Inside the gas bag a holding frame 16 is arranged, which forms the second component of the assembly.

The housing part 10 is provided with several openings 18 which are constructed here as a slit. In the vicinity of the slit several holding projections 20 are arranged, two holding projections 20 respectively being associated with an opening 18. The holding projections 20 are produced here by punching the material of the housing part and bending; the housing part preferably consists of sheet metal. The holding projections 20 are bent around a distance which corresponds to the thickness t of the material, so that on the side facing away from the openings 18 a contact surface is formed.

The holding frame, which likewise consists of sheet metal, is provided with several holding tongues 22, which are arranged so that they are respectively associated with an opening 18. Each holding tongue 22 consists of a cross-piece 24 which is connected with the holding frame 16, and of a head 26 arranged at the free end of the cross-piece 24. The head 26 is arranged symmetrically with respect to the cross-piece 24, so that it projects on both sides.

Figure 2:
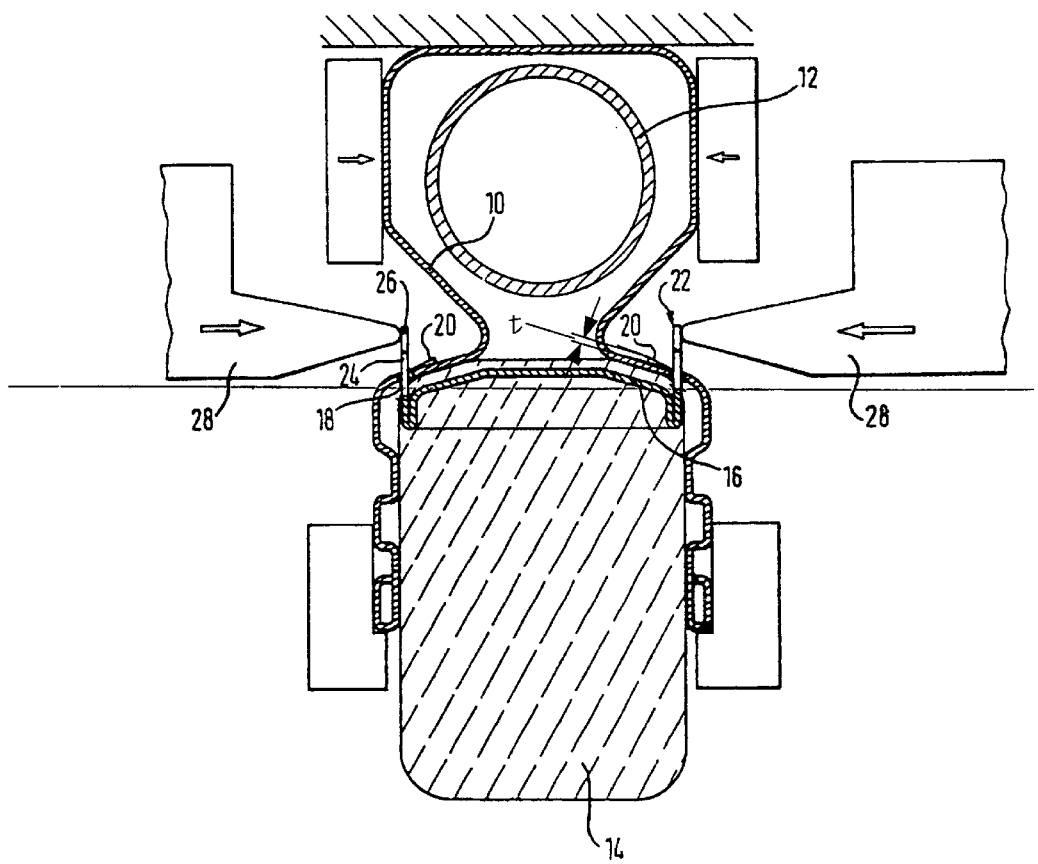
FIG. 2 shows in a diagrammatic view, partially in section, an assembly according to the invention during joining together.

For the installation of the two components to each other, the holding frame is inserted with the projecting holding tongues 22 and the folded gas bag 14 into the housing part 10, so that the holding tongues protrude through the openings 18. Then the holding tongues are bent over so that the heads 26 lie on the side of the holding projections facing away from the openings 18. This can take place by means of a pressure tool 28 shown diagrammatically in FIG. 2. In this way, the holding frame is reliably fastened to the housing part, since both the bending resistance of the cross-pieces 24 and also the form-fitting locking of the heads of the holding tongues behind the holding projections prevents a drawing out of the holding tongues 22 from the openings 18.

Figure 3:
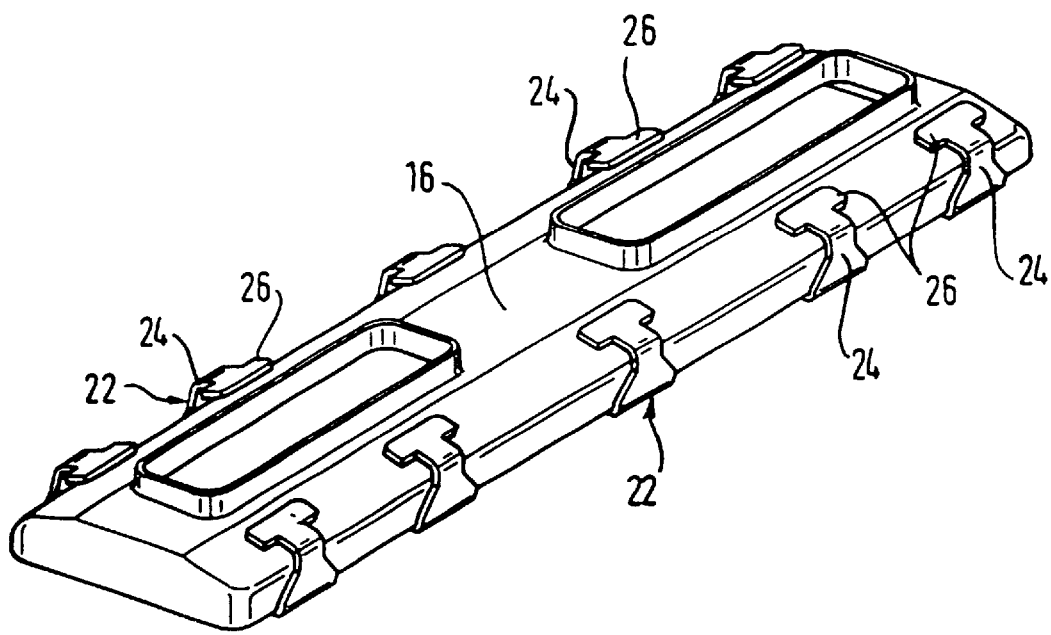
FIG. 3 shows in a perspective view a component used in an assembly according to the invention according to a variant

In FIG. 3 a holding frame is shown according to a variant, in which the holding tongues 22 are constructed with a shape which is optimized as regards strength. The cross-piece here has a wide base region which continues conically into a narrower tongue section which later lies between the holding projections. The head 26 then adjoins the tongue section

What is claimed is:

1. An assembly comprising a first component and a second component, said first component being provided with at least one opening extending through said first component in a first direction and with at least one holding projection which is associated with said opening, said holding projection being bent by a distance corresponding approximately to a wall thickness of said first component, so that said holding projection extends from said first component in said first direction and a contact surface is formed which faces away from said opening and in a second direction extending transverse to said first direction, and said second component comprising sheet metal and being provided with at least one holding tongue which has a cross-piece and a head, said cross-piece extending through said opening in said first component and being bent around such that said head lies against said contact surface of said holding projection.

2. The assembly of claim 1, wherein said cross-piece is connected to said head in a center thereof and wherein two holding projections are provided.

3. The assembly of claim 1, wherein said holding projection is a nose obtained by punching and bending.

4. The assembly of claim 1, wherein said first component is a housing part of a gas bag module for a vehicle occupant restraint system and said second component is a holding frame which is arranged inside a gas bag of said gas bag module.

* * * * *